INVENTOR.
RUFUS ALLEN JR.
BY Bruce C Lutz
ATTORNEY

INVENTOR.
RUFUS ALLEN, JR.
BY Bruce C Lutz
ATTORNEY

June 2, 1970     R. ALLEN, JR     3,515,961

SYNCHRONIZING APPARATUS FOR A CLOSED LOOP SERVO SYSTEM

Filed Jan. 21, 1966     3 Sheets-Sheet 3

INVENTOR.
RUFUS ALLEN JR.

BY Bruce C Lutz

ATTORNEY

United States Patent Office 3,515,961
Patented June 2, 1970

3,515,961
SYNCHRONIZING APPARATUS FOR A CLOSED LOOP SERVO SYSTEM
Rufus Allen, Jr., Richardson, Tex., assignor to Honeywell Inc., Minneapolis, Minn., a corporation of Delaware
Filed Jan. 21, 1966, Ser. No. 522,103
Int. Cl. G05b *11/14*
U.S. Cl. 318—18                          10 Claims

ABSTRACT OF THE DISCLOSURE

A synchronizer is disclosed which accepts an input signal and phase modulates it. The phase modulated signal is compared to an output signal of a counter and a phase error signal is generated. During the synchronize mode of operation the phase error signal is used to advance or retard the counter to synchronize the phase of the counter output signal to the input signal. During the hold mode of operation, the phase error signal is used to rebalance a system.

---

This invention pertains to control apparatus and more particularly to synchronizing apparatus for use in control systems.

A synchronizer is a device which in one mode of operation tracks or is synchronized to an input signal and which in a second mode of operation remembers a previous condition of the input signal and provides an output signal indicative of input signal errors or deviations from the previous condition. Various types of synchronizers are known in the prior art. One such synchronizer is shown in a copending application by Adrian J. Moses, Ser. No. 302,573, filed Aug. 16, 1963, now U.S. Pat. No. 3,247,507 which is assigned to the same assignee as the present invention. The synchronizer in the referenced application illustrates one method of overcoming the problem of large input signals. The solution in the above-referenced application is to provide a counter with enough stages so that the error signal will be unlikely to drive the counter past permissible limits. However, it is conceivable that the synchronizer shown in the above-referenced application may still be driven beyond its permissible range.

A solution to this problem is presented in an article by W. R. Seegmiller in the IEEE Transactions on Communications and Electronics, September 1963, page 498. This solution is to provide limiting circuits so that the synchronizer counter is limited to a certain range.

This invention provides a synchronizer which, when synchronizing, contains a phase-lock loop in which the synchronizer is phase-locked with a phase modulated input signal. When the phase of the output signal of a reference or synchronizer counter is leading the phase of an input signal, the counter drive is momentarily disrupted or decreased so that the rate of counting is momentarily slowed and the synchronizer counter is retarded. When the phase of the output signal from the counter is lagging the phase of the input signal, the counter drive is momentarily increased so that the rate of counting is correspondingly increased to advance the counter. When the synchronizer is operating in the hold mode, i.e., not synchronizing, an output error sigal is derived from the phase difference between the output signal from the counter and the input signal. This error signal may be used to rebalance a system which is being controlled.

The advantages of this invention are that it may be practiced by the use of circuitry consisting almost entirely of integrated rircuits which tends to decrease the physical size of the synchronizer and increase its reliability. Furthermore, the invention disclosed herein has unlimited rotational range. That is, the synchronizer will return to the same null position without any limitations on the magnitude of the error signal.

Accordingly, it is an object of this invention to provide a synchronizer susceptible to being built from integrated circuits.

It is a further object of this invention to provide a synchronizer which has unlimited rotational range.

These and other objects of this invention will become evident to those skilled in the art upon a reading of this specification and the appended claims in conjunction with the drawings, of which:

Figure 2:
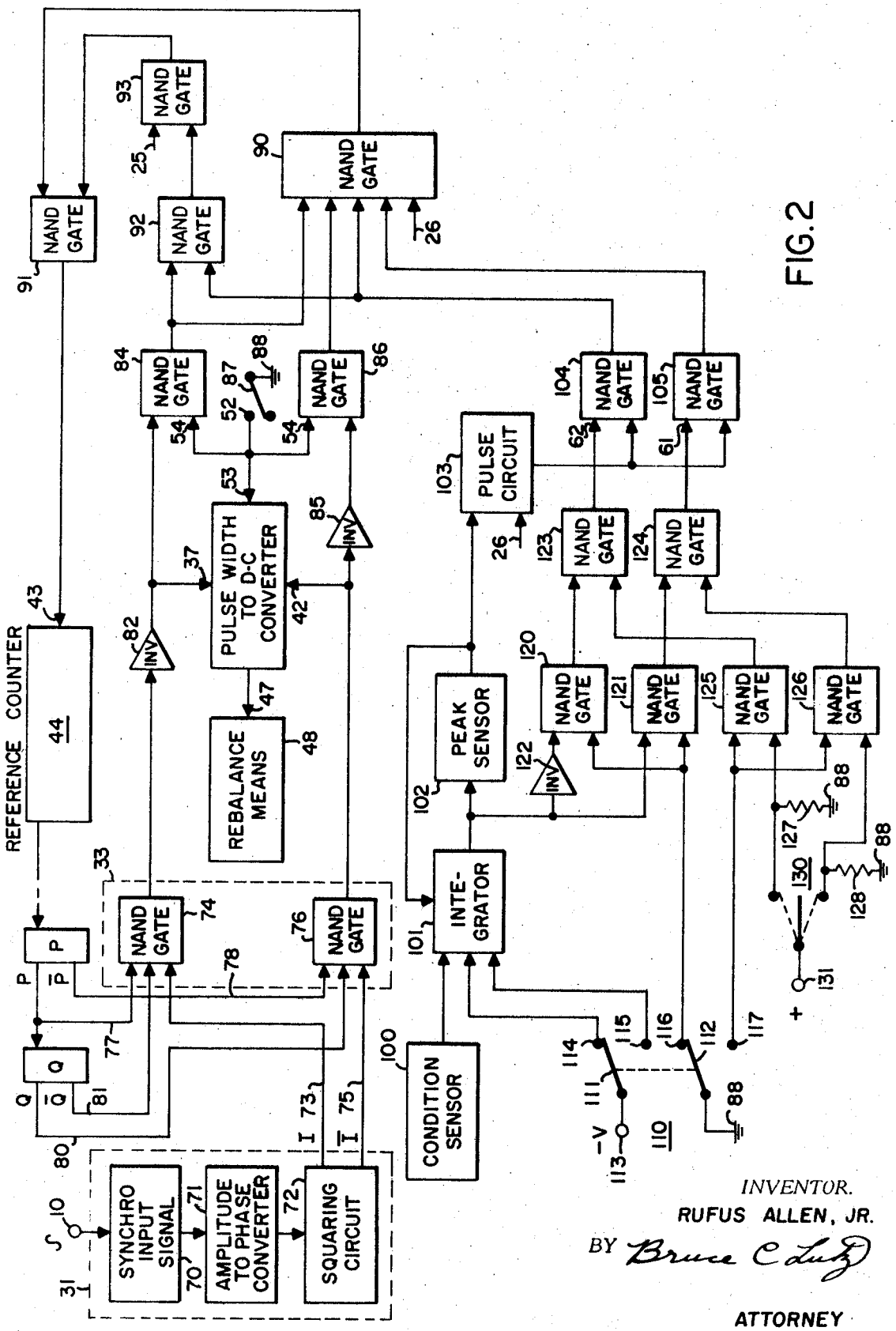
FIG. 2 is a block diagram showing a portion of FIG. 1 in greater detail.

FIGS. 3A, 3B, 3C, 3D, and 3E illustrate timing diagrams to aid in explaining FIG. 2.

It is to be understood that in the description of this invention, the term "condition sensor" is not intended to be limited to any particular type of condition sensor nor any particular condition to be sensed, although a particular example of a condition sensor and a condition to be sensed will be given herein to illustrate a particular use for this invention. The output signal from the condition sensor could be a phase modulated signal. Alternatively, the output signal may be any signal indicative of a given condition which is then converted to a phase modulated signal. Similarly, the particular logic connections shown and described herein are intended to be limited only by the scope of the appended claims. The particular logic levels shown in FIG. 3 are not to be considered limiting because those skilled in the art will realize that logic ON or "1" and OFF or "0" are merely indicative of two different voltage levels which may or may not be consistent throughout a given system. That is, a logic signal may be positive, negative, or ground with the only condition being that different signal levels are used for "1" and "0."

Figure 1:
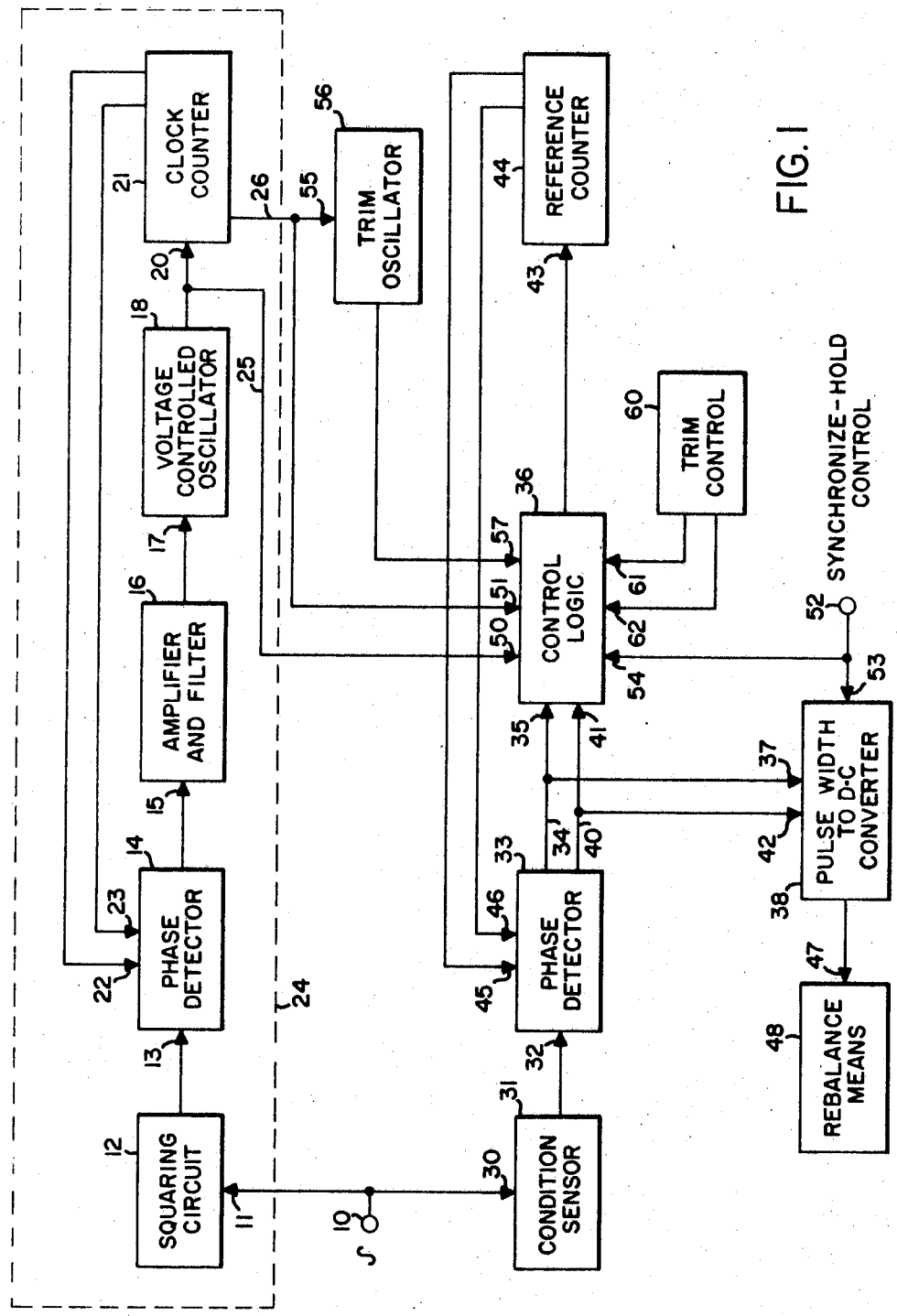
FIG. 1 is a block diagram of one embodiment of this invention.

Referring now to FIG. 1, there is shown an input terminal 10 which is adapted to be connected to a source (not shown) for supplying a reference signal which may be a 400 cycles per second sine wave. Input terminal 10 is connected to an input terminal 11 of a squaring circuit 12 the output of which is connected to a first input terminal 13 of a phase detector 14. The output of phase detector 14 is connected to an input terminal 15 of an amplifier and filter 16 the output of which is connected to an input terminal 17 of a voltage controlled oscillator 18. In the particular exampled used herein, oscillator 18 oscillates at approximately 3.28 megacycles. However, it is to be realized that the frequencies discussed herein are not to be considered limiting as the particular frequencies used will depend upon the application to which the system is put.

The output of voltage controlled oscillator 18 is connected to an input terminal 20 of a clock counter 21. If clock counter 21 is a 13 stage counter, the output square wave of the last stage of counter 21 will be a 400 cycle signal. This 400 cycle signal is connected to a second input terminal 22 of phase detector 14. Phase detector 14 compares the 400 cycle per second signals at input terminals 13 and 22 and provides an output indication of phase discrepancies. However, in this type of system, it is impossible to determine whether counter 21 is lagging or leading the phase of the output signal from squaring circuit 12. Accordingly, it is necessary to provide a further distinguishing feature which in this case is provided by an 800 cycle signal taken from the next to last stage of counter 21. This 800 cycle signal is connected to a third input terminal 23 of phase detector 14 which signal, when combined with the two 400 cycle signals, eliminates the ambiguity discussed above.

The output signal from phase detector 14 is amplified and filtered by amplifier and filter 16 and applied to oscillator 18 as the case may be. If counter 21 is leading the phase of the output signal of squaring circuit 12, the frequency of oscillator 18 is decreased and counter 21 is retarded. Similarly, counter 21 is advanced when its phase is lagging that of the output signal of the squaring circuit 12.

Squaring circuit 12, phase detector 14, amplifier and filter 16, voltage controlled oscillator 18, and clock counter 21 essentially comprise a signal supplying means or a multiplying circuit 24 which utilizes a phase lock loop to synchronize the output frequency to the input frequency. A lead 25 is connected to the output of oscillator 18 to provide a first output signal or "fast clock" from multiplying circuit 24. The output signal from the first stage of clock counter 21 is connected to a lead 26 which provides a second output signal or "unit clock" from multiplying circuit 24. In the preferred embodiment, the signals on leads 25 and 26 are whole-number frequency multiples of the reference signal applied to input terminal 10 except during transients which can be neglected in this application. The signal on lead 26 is exactly one-half the frequency of the signal on lead 25 in the preferred embodiment, however, other frequency relationships could be used between the signals on leads 25 and 26 and at terminal 10.

Input terminal 10 is further connected to an input terminal 30 of a condition sensor or condition responsive means 31 which may be, for example, the pitch attitude channel of an aircraft control system or a similar condition sensor. The output of condition sensor 31 is connected to a first input terminal 32 of a phase detector 33 which has first and second outputs connected to leads 34 and 40, respectively. Lead 34 is connected to an input terminal 35 of a logic means or control logic circuit 36 and is further connected to an input terminal 37 of a pulse width to D-C converter 38. Lead 40 is connected to an input terminal 41 of logic circuit 36 and is further connected to an input terminal 42 of converter 38. The output of logic 36 is connected to the input terminal 43 of a reference counter 44 which is similar to clock counter 21. First and second outputs of reference counter 44 are connected to second and third input terminals 45 and 46, respectively, of phase detector 33.

An output of converter 38 is connected to an input terminal 47 of a rebalance means 48. Rebalance means 48 may be, for example, a follow-up device to rebalance or correct the pitch attitude of an aircraft.

Leads 25 and 26 are connected to input terminals 50 and 51, respectively, of logic circuit 36. An input terminal 52 labeled synchronize-hold control is connected to an input terminal 53 of converter 38 and is further connected to an input terminal 54 of logic circuit 36. Lead 26 is further connected to an input terminal 55 of a trim oscillator 56 the output of which is connected to an input terminal 57 of logic circuit 36. A trim control circuit 60 has first and second outputs connected to input terminals 61 and 62, respectively, of logic circuit 36.

Signals applied to input terminal 52 condition converter 38 and logic circuit 36 to make converter 38 and logic circuit 36 responsive to output signals from phase detector 33. When a synchronize signal is applied to terminal 52, converter 38 is inhibited so that it is not responsive to output signals from phase detector 33 and logic circuit 36 is enabled so that it is responsive to output signals from phase detector 33. Similarly, a hold signal applied to terminal 52 enables converter 38 and inhibits logic circuit 36.

Logic circuit 36 normally selects the unit clock or signal present on lead 26 and applies that signal to the input terminal 43 of reference counter 44. If reference counter 44 is a 12 stage counter, the output of the last stage is a 400 cycle square wave and the output signal from the next to the last stage is an 800 cycle signal. When a hold signal is applied to terminal 52, the unit clock is continuously selected to drive the reference counter 44 so that the last stage output signal of 44 is maintained at the phase of the signal from condition sensor 31 which existed at the instant when the hold signal was applied.

Condition sensor 31 provides a phase modulated output signal which is indicative of the reference signal applied at terminal 10 modulated in accordance with the given condition, for example, pitch attitude of an aircraft. When the synchronizer is in the hold mode, phase detector 33 provides pulse width modulated output signals on leads 34 and 40 which are of a width indicative of the phase difference between the output signal from reference counter 44 and the output signal from condition sensor 31. Pulse width to D-C converter 38 converts these signals to a D-C error signal which is applied to rebalance means 48 to correct the pitch attitude and which correspondingly varies the output signal from condition sensor 31 to rebalance the system.

When the synchronizer is in the synchronize mode, logic circuit 36 is enabled so that it is receptive to the output signals from phase detector 33. If the phase of the output signals from reference counter 44 is lagging the phase of the output signal from condition sensor 31, phase detector 33 provides an output signal on lead 34 which is received by logic circuit 36. In response to the signal on lead 34, logic circuit 36 selects the fast clock or the signal on lead 25 and momentarily couples that signal to the input 43 of reference counter 44. As the signal on lead 25 is a fast clock of a signal twice the frequency as that on lead 26, reference counter 44 is advanced or momentarily the rate of counting of reference counter 44 is doubled so that the phase of this output signal is advanced. Similarly, when reference counter 44 provides an output signal of a phase which is leading the phase of the output signal from condition sensor 31, phase detector 33 provides an output signal on lead 40 which causes logic circuit 36 to momentarily disconnect the unit clock or signal on lead 26 from input 43 of reference counter 44. This momentarily prevents any input signals from driving reference counter 44 thereby retarding the output signals from counter 44. It is to be realized that the fast clock need not be twice the frequency of the unit clock and it is to be further realized that it is within the scope of this invention to use a "slow clock" to retard counter 44 in a manner similar to that in which the fast clock advances counter 44. It is also within the scope of this invention to insert the unit clock at the input of the second stage of counter 44, or even at any subsequent stage, in order to advance the output phase. This would eliminate the need for a fast clock. The existing status of integrated circuits led to the use of a fast clock.

If this synchronizer is used in a control system on an aircraft, it may be desirable for the pilot to be able to correct for small deviations during the hold mode of operation. For example, the pitch attitude of an aircraft may change after a time due to fuel consumption and the aircraft will begin to deviate from the preset course. Thus, trim control circuit 60 together with trim oscillator 56 is provided to enable the pilot to correct for the small deviations. Trim control circuit 60 may be operated by the pilot to apply advance and retard signals to terminals 62 and 61 which are combined with the output signal from trim oscillator 56 by the logic circuit 36 to advance and retard reference counter 44 as is desired. Trim oscillator 56 is connected to receive a signal from lead 26 which synchronizes the output signal from oscillator 56 with the rest of the system.

Input terminal 52 is shown as being connected to input terminal 53 of converter 38, however, this connection may be unnecessary in many applications. Generally, the synchronizer, when operating in the synchronize mode, operates much faster than rebalance means 48 so that by the time rebalance means 48 is able to respond to output signals from converter 38, the reference counter 44 has already been synchronized to the output signal of condition sensor 31. Accordingly, converter 38 does not need to be inhibited during the synchronize mode unless rebalance means 48 is affected by output signals from phase detector 33 during the synchronize mode of operation.

FIG. 2 shows a portion of FIG. 1. Components and circuits which are the same as those in FIG. 1 are labeled with the same reference numerals. Condition sensor 31 is expanded to illustrate one example of a sensor. Input terminal 10 is connected to a synchro input signal supplying device 70, the output of which is connected to an amplitude-to-phase converter 71. The synchro input signal supplying device 70 provides an amplitude modulated signal modulated in accordance with the pitch attitude of an aircraft. The amplitude-to-phase converter 71 converts the amplitude modulated signal to a phase modulated signal which is applied to a squaring circuit 72. Squaring circuit 72 converts the phase modulated sine wave signal from converter 71 to a phase modulated square wave signal. A first output of squaring circuit 72 is connected by a lead 73 to an input of a NAND gate 74 and a second output is connected by means of lead 75 to a NAND gate 76. The signal on lead 73 may be called a logical signal labeled I and the signal on lead 75 is a logical $\bar{I}$ which is the inverse of the signal on lead 73. The $\bar{I}$ signal may be derived from the I signal by applying the I signal to an inverter which may be included in the squaring circuit 72.

In this specification, the term NAND gate is defined as a gate which provides a "0" output signal when "1" input signals are present at the inputs thereof. When at least one "0" input signal is applied to the gate, the output signal is a "1" signal. The term NOR gate is defined for the purpose of this specification as a gate which provides a "0" output signal when a "1" input signal is applied to at least one input but which provides a "1" output signal otherwise. Those skilled in the art will realize that conventional AND-OR logic could be used as well.

Reference counter 44 is shown in expanded form with the last stage being labeled Q and the next to the last stage being labeled P. A P output signal of stage P of reference counter 44 is connected by means of a lead 77 to an input of gate 74. A $\bar{P}$ output signal of stage P is connected by means of a lead 78 to an input of gate 76. A Q output signal of stage Q is connected by means of a lead 80 to an input of gate 76 and a $\bar{Q}$ output signal is connected by means of a lead 81 to an input of gate 74. The P and $\bar{P}$ outputs are signals which may be taken from opposite sides of a flip-flop so that they are logical inverses of each other. Q and $\bar{Q}$ are similar to P and $\bar{P}$ except that the frequency of P is twice that of Q, etc. Gates 74 and 76 are the basic components of phase detector 33. Q and $\bar{P}$ are gated together, as are $\bar{Q}$ and P, because the counter 44 counts in a negative manner. If counter 44 were set up to count in a positive direction, then Q and P would be gated together, as would $\bar{Q}$ and $\bar{P}$, in order to obtain suitable control signals. The counter direction imposes no limitation on the subject device.

An output of gate 74 is connected through an inverter 82 to an input of a gate 84. The output of inverter 82 is further connected to terminal 37 of converter 38. An output of gate 76 is connected through an inverter 85 to an input of a gate 86. The output of gate 76 is further connected to terminal 42 of converter 38. Input terminal 52 is shown as one contact of a single throw switch. Terminal 52 is connected to second inputs on each of gates 84 and 86. A movable switch contact 87 is adapted to be connected to terminal 52 whereby terminal 52 is grounded through switch contact 87 to a common conductor or ground 88. When terminal 52 is grounded, gates 84 and 86 are inhibited so that they are not responsive to output signals from inverters 82 and 85. When terminal 52 is ungrounded or floating, gates 84 and 86 are responsive to input signals.

An output of gate 86 is connected to an input of a NAND gate 90 the output of which is connected to an input of a NAND gate 91. An output of gate 84 is connected to a second input of gate 90 and is further connected to an input of a NAND gate 92 the output of which is connected to an input of a NAND gate 93. Lead 25 is connected to another input of gate 93 the output of which is connected to an input of gate 91. The output of gate 91 is connected to input terminal 43 of reference counter 44. Lead 26 is connected to a third input of gate 90.

A condition sensor 100 has an output connected to an input of an integrator 101 the output of which is connected to an input of a peak sensor 102. The output of peak sensor 102 is connected to an input of a pulse circuit 103 and is further connected to a reset input of integrator 101. The output of pulse circuit 103 is connected to one input of each of NAND gates 104 and 105. The output of gate 105 is connected to a fourth input of gate 90 and the output of gate 104 is connected to a fifth input of gate 90 and is further connected to an input of gate 92. Lead 26 is connected to a second input of pulse circuit 103.

There is further shown a double-pole double-throw switch 110 which has first and second movable or variable switch contacts 111 and 112. One end of variable switch contact 111 is connected to a negative source of energizing potential 113. The other end of switch contact 111 may be connected alternatively to terminals 114 and 115. Variable switch contact 112 has one end connected to ground 88 the other side of which is variable between terminals 116 and 117. Terminals 114 and 115 are connected to second and third inputs of integrator 101. Terminal 116 is connected to one input of each of gates 120 and 121. The output of integrator 101 is connected to a second input of gate 121 and is further connected through an inverter 122 to a second input of gate 120. The output of gate 120 is connected to an input of a NAND gate 123 the output of which is connected to an input of gate 104. An output of gate 121 is connected to an input of a NAND gate 124 the output of which is connected to an input of gate 105. Terminal 117 is connected to an input of each of gates 125 and 126 the outputs of which are connected to inputs of gates 123 and 124, respectively. A second input of gate 125 is connected by means of a resistor 127 to ground 88 and a second input of gate 126 is connected by means of a resistor 128 to ground 88. A double-throw switch 130 is adapted to connect the second input of either of gates 125 or 126 to a source of positive potential 131.

The operation of FIG. 2 will be explained with reference to the pitch attitude channel of an aircraft control system. Assume that switch contact 87 is not connected to terminal 52 so that the apparatus is in the synchronize mode. In this mode, the pilot is free to maneuver the aircraft as is desired and the counter will synchronize to the output signal from the condition sensor 31.

Assume that the output signal from the Q stage of reference counter 44 is exactly in phase with output signal from squaring circuit 72. I and $\bar{Q}$ are both 400 cycle signals which are the logical inverse of each other so that NAND gate 74 does not receive coincident signals. Thus, at least one of the three input signals to gate 74 is always a "0" while the output signal from gate 84 is a "1." Similarly, NAND gate 76 provides a "1" output signal which is inverted by inverter 85 and applied to gate 86. Gate 86 provides a "1" output signal. NAND gates 104 and 105 each provide "1" output signals so that NAND gate 90 is continuously receiving logical "1" signals at four of its inputs. Lead 26 supplies a square wave signal to NAND gate 90 which in response provides a square wave output signal which is coupled through NAND gate 91 to the input 43 of reference counter 44. NAND gate 92 provides a "0" output signal to NAND gate 93 so that NAND gate 93 does not couple the pulses from lead 25 to NAND gate 91.

Figure 3A:
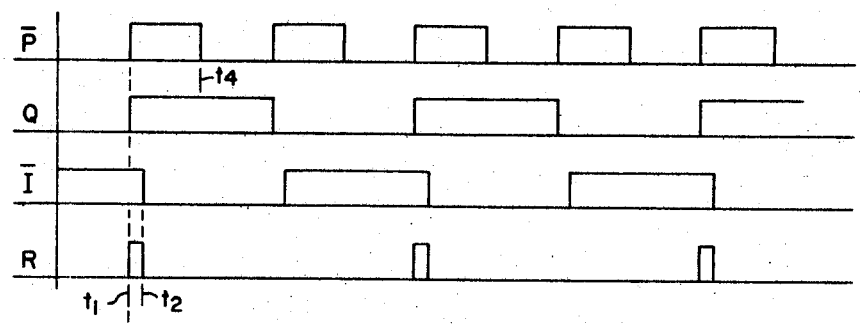

Now assume that the output signal from the Q stage of reference counter 44 is leading the output signal from squaring circuit 72 so that it is desired to retard reference counter 44. Referring now to FIG. 3A, it is seen that the $\bar{P}$, Q, and $\bar{I}$ signals are all coincident for a short period of time from $t_1$ to $t_2$. As these three signals are all applied to NAND gate 76, NAND gate 76 provides a "0" output signal between $t_1$ and $t_2$ or when all three inputs are coincident. Inverter 85 inverts this signal from NAND gate 76 which is inverted again by gate 86 to inhibit NAND gate 90. When NAND gate 90 is inhibited, the unit clock or the pulses on lead 26 are disconnected from the input of reference counter 44 for a time proportional to the width of the output pulse from NAND gate 76. This is seen in FIG. 3A wherein the R logic signal is the signal provided by inverter 85. In this context, R stands for retard and reference counter 44 is retarded upon the occurrence of an R signal.

Figure 3B:
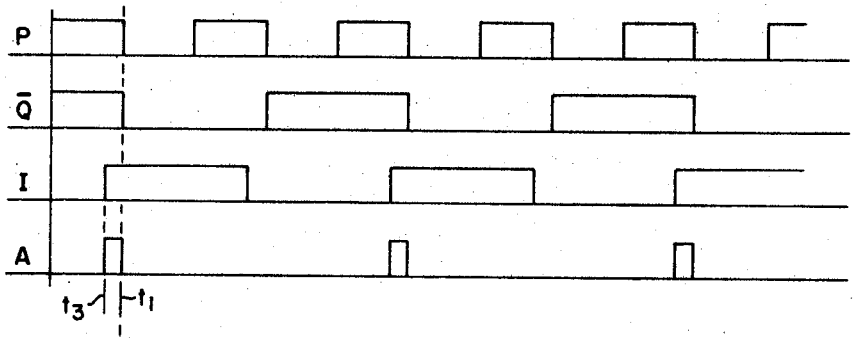

FIG. 3B illustrates the operation of the synchronizer when the phase of the output signal from reference counter 44 is lagging the phase of the output signal from squaring circuit 72. When this phase relationship occurs, the P, $\bar{Q}$, and I signals are coincident for a short period of time between $t_3$ and $t_1$ which causes NAND gate 74 and inverter 82 to provide an advance signal to gate 84. The advance pulse, which is shown in FIG. 3B in the logic diagram labeled A, causes gate 84 to provide a logical "0" output. The "0" output signal from gate 84 inhibits NAND gate 90 to disconnect the unit clock from the input reference counter 44. However, NAND gate 92 provides a "1" output signal which causes NAND gate 93 to couple the fast clock or the pulses on lead 25 through NAND gate 91 to the input 43 of reference counter 44. As the pulses on lead 25 are of a frequency twice that of the pulses on lead 26, reference counter 44 is advanced by an amount proportional to the width of the A pulse.

Figure 3C:
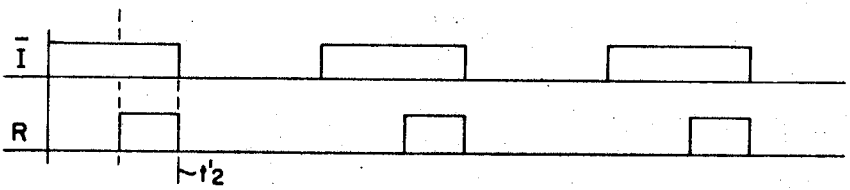
Figure 3D:
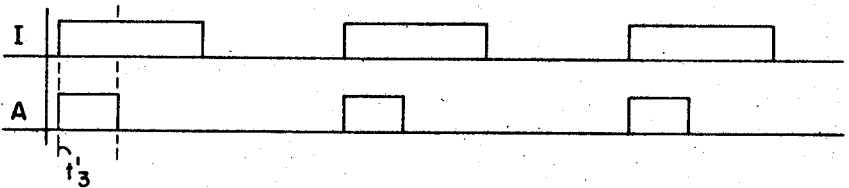

FIGS. 3C and 3D show the A and R pulses when the phase difference approaches 90 degrees. Note that the width of the A and R pulses is greater so that the output signals from gates 74 and 76 are pulse width modulated in accordance with the phase difference between the output signals from the reference counter 44 and the output signals from squaring circuit 72.

Figure 3E:
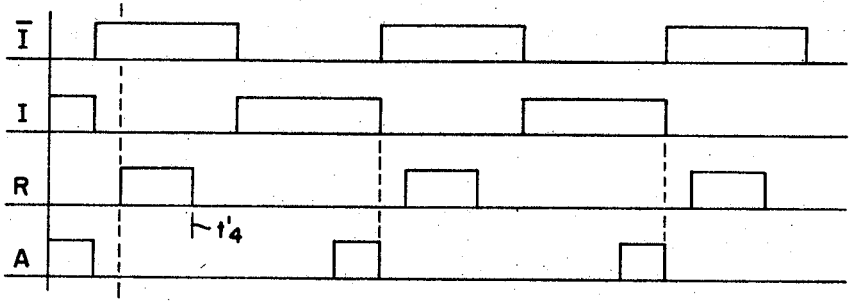

FIG. 3E shows the condition of the A and R pulses when the phase of the output signals from the reference counter 44 is leading the phase of the output signal from squaring circuit 72 by more than 90 degrees. When the phase difference is 90 degrees, the R pulses have their greatest width and this width remains constant until the error reaches 180 degrees. Note the $\bar{P}$ pulse ends at $t_4$ which ends the R pulse. Between 90 degrees and 180 degrees, A pulses also appear at the output of gate 74, however, they are shorter than the R pulses so that the reference counter 44 is retarded by an amount equal to the difference between the A and R pulses.

When the phase of the output signal of reference counter 44 is lagging the phase of the output signal of squaring circuit 72 by more than 90 degrees, the operation of the synchronizer is essentially the same with the role of the A and R pulses reversed. At 180 degrees, a point of unstable equilibrium is reached wherein the A and R pulses are exactly equal in width. However, as this is an unstable point of equilibrium, any deviation from equilibrium will cause the synchronizer to return to a condition of zero phase difference.

From the above description, it is seen that the synchronizer has unlimited rotational range so that no limiting feature is required to limit the synchronizer to any predetermined rotational range.

Now assume that switch contact 87 is closed so that terminal 52 is grounded. Gates 84 and 86 are inhibited so that the unit clock or pulses on lead 26 are continuously selected by NAND gate 90. The output pulses from inverter 82 and NAND gate 76 are now applied to pulse width to D-C converter 38 which provides an output error signal when there is a phase deviation. This output error signal is proportional to the phase difference over a range selected for each application but not exceeding a phase difference of plus or minus 90 degrees a coherent control signal will be obtained over a range greater than plus or minus 90 degrees, the exact range being dependent on application. For phase differences of greater than 90 degrees, both advance and retard signals occur so that the output signal is no longer proportional to the phase difference. However, in an aircraft, it would be only under the most unusual circumstances that a phase difference of greater than 90 degrees could possibly occur. Generally, phase differences would be within a few degrees of a null condition.

To understand the operation of the trim function, assume that switch 110 is in a position such that variable contact 111 is connecting the negative potential 113 to terminal 114 and that variable contact 112 is connecting terminal 116 to ground 88. Gates 120 and 121 are inhibited so that they continuously provide "1" output signals to NAND gates 123 and 124, respectively. NAND gates 123 and 124 then provide "0" output signals to NAND gates 104 and 105, respectively. Gates 104 and 105 then provide their normal "1" output signals.

As contact 117 is left floating, gates 125 and 126 are enabled. However, as the second input of each of gates 125 and 126 are normally connected to ground 88, gates 125 and 126 provide "1" output signals to gates 123 and 124, respectively, which provide "0" outputs to gates 104 and 105 to provide "1" outputs to NAND gate 90 to continuously select the unit clock or the signal on lead 26.

When the negative source of potential is connected to terminal 114 by variable contact 111, a switching transistor connected to the input of integrator 101 disconnects the output signal from the condition sensor 100 from the input of integrator 101. In place of the output signal from condition sensor 100, a D-C input signal is connected to integrator 101 so that integrator 101 provides a symmetrical constant frequency sawtooth output waveform. Peak sensor 102 triggers when this sawtooth waveform reaches a predetermined amplitude and provides a signal to integrator 101 which resets integrator 101 to zero. The output signal from peak sensor 102 is also applied to a pulse circuit 103 which conditions pulse circuit 103 to provide an output pulse upon the occurrence of a pluse on lead 26. The output pulses from pulse circuit 103 are applied to NAND gates 104 and 105.

If at this time the pilot desires to trim or vary the pitch attitude of the aircraft by a small amount, he operates switch 130. For example, if switch 130 is connected to the input of gate 126, gate 126 provides a "0" output which causes NAND gate 124 to provide a "1" output to NAND gate 105. Upon the occurrence of a pulse from pulse circuit 103, NAND gate 105 provides an output signal to NAND gate 90 to inhibit NAND gate 90. As the output pulses of pulse circuit 103 are synchronized with the unit clock or the pulses on lead 26, the output signals from NAND gate 105 are also synchronized with the pulses on lead 26. The amount that reference counter 44 is retarded is dependent upon the length of time that switch 130 is operated. The number of unit clock pulses which are suppressed by NAND gate 90 is proportional to or dependent upon the rate at which integrator 101 and peak sensor 102 recycle. Pulse circuit 103 provides one output pulse for each output pulse from peak sensor 102. Thus, two variables are combined to provide the trim rate or the change in pitch attitude per unit time. Furthermore, the number of unit clock pulses which are suppressed depends upon the width of the output pulse from pulse circuit 103.

Similarly, when the pilot connects switch 130 to the input of gate 125, gate 125 provides an output signal through NAND gate 123 to NAND gate 104 to inhibit NAND gate 90 upon the occurrence of a pulse from pulse circuit 103. The output signal from NAND gate 104 energizes NAND gate 92 and NAND gate 93 so that fast clock pulses are coupled from lead 25 through NAND gate 93 and NAND gate 91 to the input 43 of reference counter 44.

Now assume that the position of switch 110 is reversed so that variable contact 112 is connected to terminal 117 and variable contact 111 is connected to terminal 115. The negative potential applied at terminal 113 conditions integrator 101 to accept output signals from condition sensor 100. Condition sensor 100 may be, for example, an error signal derived from an altimeter. To explain further, assume that this invention is being used in the pitch attitude channel of an aircraft control system. Deviations in pitch attitude are ultimately reflected in altitude errors which may be sensed by an altimeter. For example, it may be desired to fly the aircraft horizontal at a predetermined altitude. As fuel is consumed, the progressively lighter aircraft will gain altitude with a fixed throttle setting and attitude. The altitude can be conrolled by adjusing the pitch attitude.

An altitude error signal provided by condition sensor 100 is integrated by integrator 101. As peak sensor 102 does not trigger until the integrator output reaches a predetermined level, the frequency of the output signal from peak sensor 102 and hence pulse circuit 103 is dependent upon the magnitude of the output error signal from condition sensor 100. From this description, it is seen that integrator 101 and peak sensor 102 are merely a digitizer for digitizing the output signal from condition sensor 100.

During this mode of operation, contact terminal 117 of switch 110 is grounded so that gates 125 and 126 continuously provide "1" outputs. However, gates 120 and 121 are enabled. Integrator 101 integrates both positive and negative input signals from condition sensor 100 and the integrator output is applied to gate 121 and through inverter 122 to gate 120. Thus, gates 121 and 120 discriminate between positive and negative error so that either retard or advance signals are supplied by these gates depending upon the polarity of the output of integrator 101.

The operation of the synchronizer in response to altitude errors is the same as was described herein before. It is easily seen that by integrating the output signal from condition sensor 100, the trim rate is made dependent upon the magnitude of the error or deviation sensed by condition sensor 100.

It will be evident to those skilled in the art that this invention has many applications other than the pitch attitude channel of an aircraft control system. It will also be evident to those skilled in the art that various other gating arrangements may be used to perform the same logic functions as are performed by the circuitry shown and described herein. Accordingly, I do not wish to be limited by the specific structure and circuits shown but only by the scope of the appended claims.

I claim as my invention:

1. Synchronizing apparatus comprising, in combination:
reference means for supplying a frequency reference signal;
pulse supplying means connected to said reference means for supplying pulses at an output thereof of frequencies related to the frequency of said frequency reference signal;
condition sensing means connected to said reference means for providing a phase modulated output signal;
counter means;
phase detecting means connected to said counter means and to said condition sensing means to receive output signals therefrom, said phase detecting means operating to provide output signals indicative of phase differences between said output signals from said condition sensing means and output signals from said counter means; and
logic means connected to said pulse supplying means, to said counter means, and to said phase detecting means, said logic means coupling said pulses to an input of said counter means to cause said counter means to count at a first rate, said logic means operating in response to said output signals from said phase detecting means to intermittently disconnect said pulses from the input of said counter means when the phase difference is of the first sense and to intermittently couple said pulses to an input of said counter means to cause said counter means to count at a second rate greater than said first rate when the phase difference is of a second sense.

2. Apparatus of the class described comprising, in combination:
reference means for supplying a frequency reference signal;
condition responsive means connected to said reference means for phase modulating said frequency reference signal in accordance with a given condition;
counting means;
logic means connected to an input of said counting means;
phase detecting means connected to said logic means, to said condition responsive means and to said counting means for providing, in response to a phase difference between output signals from said counting means and from said condition responsive means, signals to said logic means, the signals being of a first sense for a phase difference of a first sense and of a second sense for a phase difference of a second sense; and
frequency multiplying means connected to said reference means and to said logic means for supplying first pulses and second pulses to said logic means, said first and second pulses being frequency related to the frequency of said frequency reference signal, said logic means being operable to couple said first pulses to the input of said counting means, to intermittently disconnect said first pulses from said counting means in response to signals of said first sense from said phase detecting means, and to intermittently couple said second pulses to the input of said counting means in response to signals of said second sense from said phase detecting means.

3. Synchronizing apparatus as defined in claim 1 in which said condition sensing means includes means for amplitude modulating said frequency reference signal in accordance with a given condition and amplitude-to-phase conversion means connected thereto, said amplitude-to-phase conversion means providing a phase modulated output signal modulated in accordance with the given condition, said amplitude-to-phase conversion means being connected to said phase detecting means.

4. Synchronizing apparatus comprising, in combination:
  first signal supplying means for supplying a reference signal;
  second signal supplying means connected to said first signal supplying means for receiving said reference signal therefrom, said second signal supplying means operable to provide signals of frequencies related to said reference signal;
  condition sensing means connected to said first signal supplying means for providing a phase modulated signal modulated in accordance with a given condition;
  logic means connected to said second signal supplying means;
  counter means connected to said logic means; and
  phase detecting means connected to said condition sensing means, to said counter means, and to said logic means, said phase detecting means providing output signals to said logic means, said output signals being indicative of the phase difference between said signals from said condition sensing means and signals from said counter means, said logic means operating in response to said output signals to selectively couple said signals from said second signal supplying means to an input of said counter means whereby the rate of counting of said counter means is increased for phase differences of a first sense and is decreased for phase differences of a second sense.

5. Synchronizing apparatus as defined in claim 4 in combination with:
  converting means connected to said phase detecting means to receive said output signals therefrom, said converting means operating to convert said output signals to a direct signal;
  rebalance means connected to receive said direct signal from said converting means for varying said given condition in response to said direct signal; and
  control means connected to said logic means, said control means operable to selectively enable and inhibit said logic means whereby said logic means, when enabled, is responsive to said output signals from said phase detecting means.

6. Synchronizing apparatus as defined in claim 4 in which said second signal supplying means provides first and second clock pulses to said logic means and said logic means couples said first clock pulses to the input of said counter means, said logic means intermittently interrupting said first clock pulses in response to signals from said phase detecting means indicative of phase differences of the second sense and intermittently coupling said second clock pulses to the input of said counter means in response to signals from said phase detecting means indicative of phase differences of the first sense.

7. Synchronizing apparatus as defined in claim 6 in combination with:
  converting means connected to said phase detecting means to receive said output signals therefrom, said converting means operating to convert said output signals to a direct signal;
  rebalance means connected to receive said direct signal from said converting means for varying said given condition in response to said direct signal; and
  control means connected to said logic means, said control means being operable to selectively enable and inhibit said logic means whereby said logic means, when enabled, is responsive to said output signals from said phase detecting means.

8. Synchronizing apparatus as defined in claim 5 in combination with:
  third signal supplying means connected to said logic means for supplying a pulse signal thereto; and
  second control means connected to said logic means, said third signal supplying means and said second control means operating to provide signals to said logic means to selectively increase and decrease the rate of counting of said counter means when said first named control means inhibits said logic means.

9. Synchronizing apparatus as defined in claim 8 in which said third signal supplying means includes second condition sensing means, said third signal means being operable in a first mode to provide a constant frequency pulse signal and being operable in a second mode to provide a pulse signal of a frequency dependent upon a condition sensed by said second condition sensing means.

10. Synchronizer apparatus comprising, in combination:
  means for supplying pulse signals;
  means for supplying a phase modulated input signal;
  counting means connected to receive the pulse signals from said means for supplying pulse signals;
  phase detecing means connected to said means for supplying a phase modulated input signal and to said counting means for providing an output signal indicative of phase differences between said input signal and an output signal from said counting means;
  first logic means connected to said phase detecting means, to said counting means, and to said means for supplying pulse signals for increasing the rate of counting of said counting means when the output signal from said phase detecting means indicates that the phase of the output signal from said counting means lags the phase of said input signal;
  second logic means connected to said phase detecting means, to said counting means, and to said means for supplying pulse signals for decreasing the rate of counting of said counting means when the output signal from said phase detecting means indicates that the phase of the output signal from said counting means leads the phase of said input signal;
  rebalance means connected to said phase detecting means for receiving the output signal therefrom for rebalancing a system in response to the output signal from said phase detecting means; and
  control means connected to said first and second logic means for inhibiting said first logic means from increasing the counting rate of said counting means and for inhibiting said second logic means from decreasing the counting rate of said counting means during the time said rebalance means is rebalancing the system.

References Cited

UNITED STATES PATENTS

| | | |
|---|---|---|
| 2,549,505 | 4/1951 | Mohr. |
| Re. 23,932 | 2/1955 | Coughlin. |
| Re. 24,240 | 11/1956 | Canfora. |
| 2,943,248 | 6/1960 | Ritchey. |
| 2,983,872 | 5/1961 | Williamson et al. |
| 3,011,110 | 11/1961 | Ho et al. |
| 3,258,667 | 6/1966 | McDonough et al. |
| 3,320,501 | 5/1967 | Davies. |
| 3,374,359 | 3/1968 | Anderson. |

THOMAS E. LYNCH, Primary Examiner

U.S. Cl. X.R.

318—489